United States Patent [19]

Snyder

[11] Patent Number: 4,930,724
[45] Date of Patent: Jun. 5, 1990

[54] POWERED AIRFOIL CANOPY AIRCRAFT

[76] Inventor: Stephen L. Snyder, 420 Pleasant Valley Ave., Moorestown, N.J. 08057

[21] Appl. No.: 487,221

[22] Filed: Mar. 11, 1983

[51] Int. Cl.$^5$ .............................................. B64C 39/00
[52] U.S. Cl. ...................................... 244/13; 244/902; 244/903; 244/8
[58] Field of Search ...................... 244/13, 17.11, 6, 8, 244/235, DIG. 1, 142, 145, 152, 900, 902, 903

[56] References Cited

U.S. PATENT DOCUMENTS

| | | | |
|---|---|---|---|
| 3,931,943 | 1/1976 | Westergren et al. | 244/235 |
| 4,071,206 | 1/1978 | Magill | 244/4 A |
| 4,375,280 | 3/1983 | Nicolaides | 244/13 |
| 4,399,969 | 8/1983 | Gargano | 244/DIG. 1 |
| 4,426,049 | 1/1984 | Stewart | 244/69 |

FOREIGN PATENT DOCUMENTS 1543358 10/1968 France .................. 244/DIG. 1
61594 6/1912 Switzerland .................. 244/DIG. 1

OTHER PUBLICATIONS

Nicolaides, "Parafoil Powered Flight Performance", AFFDL-TR-72-23, 1972.

Primary Examiner—Galen Barefoot
Attorney, Agent, or Firm—Fleit, Jacobson, Cohn, Price, Holman & Stern

[57] ABSTRACT

Load lines connect chordwise spaced portions of a ram air inflated, airfoil canopy to spaced anchors connected to a pilot supporting vehicle frame on which a forward thrust producing unit is removably mounted. The geometry of the assembled aircraft enhances take-off inflation of the canopy, establishes a stable flight frame when airborne, and enables simple engine throttle control of the thrust producing unit to regulate climb, descent and level flight. Common control is applied for both ground steering of the vehicle frame and airborne steering of the canopy.

13 Claims, 13 Drawing Sheets

LEVEL FLIGHT $T = D$
$L_v = W$
$R = R'$

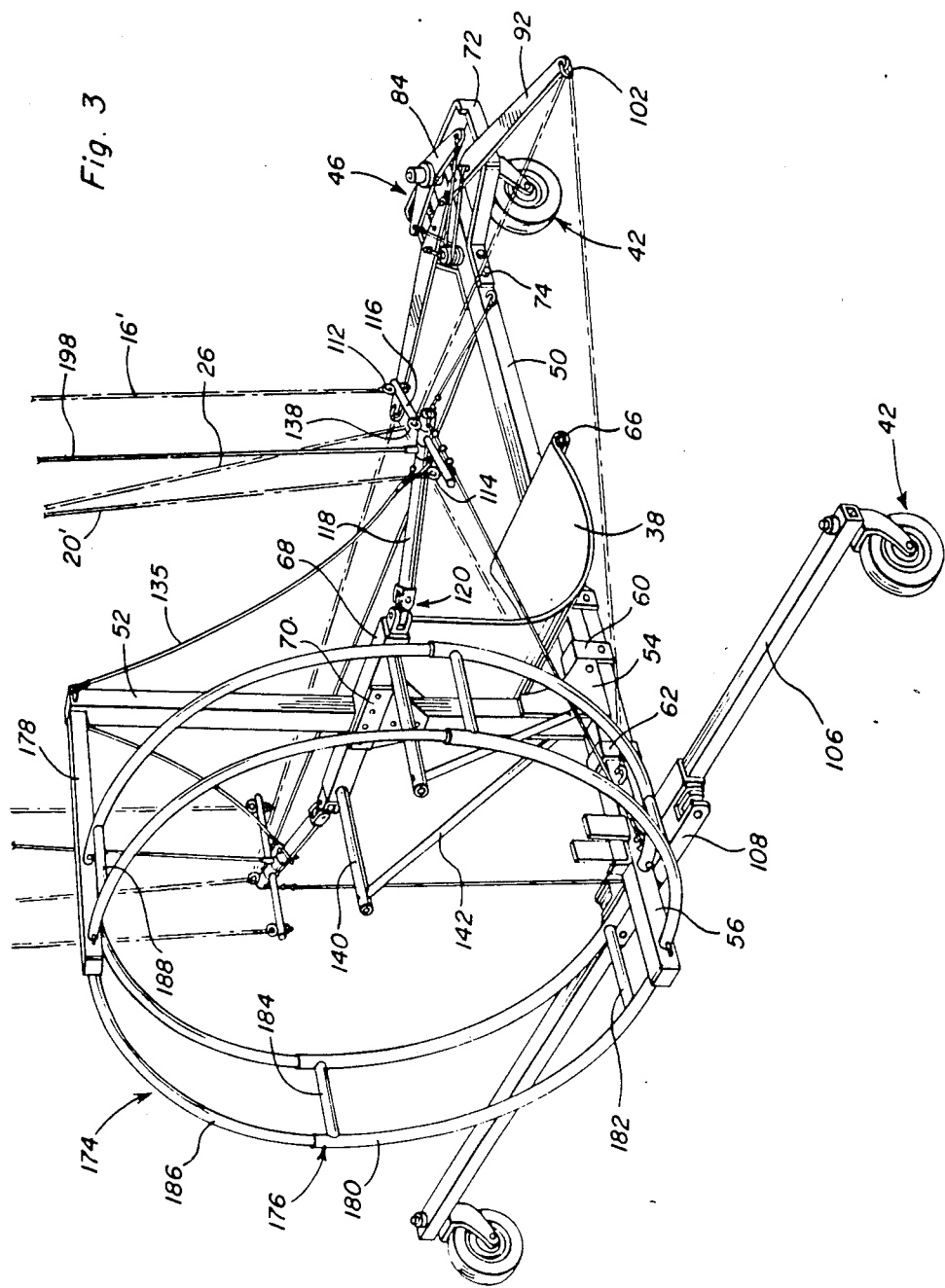

TAKE-OFF

T > D

CLIMB

T ≈ D
$L_v$ > W

NON-POWERED DESCENT

R ≈ $L_v$ ≈ W
T = 0

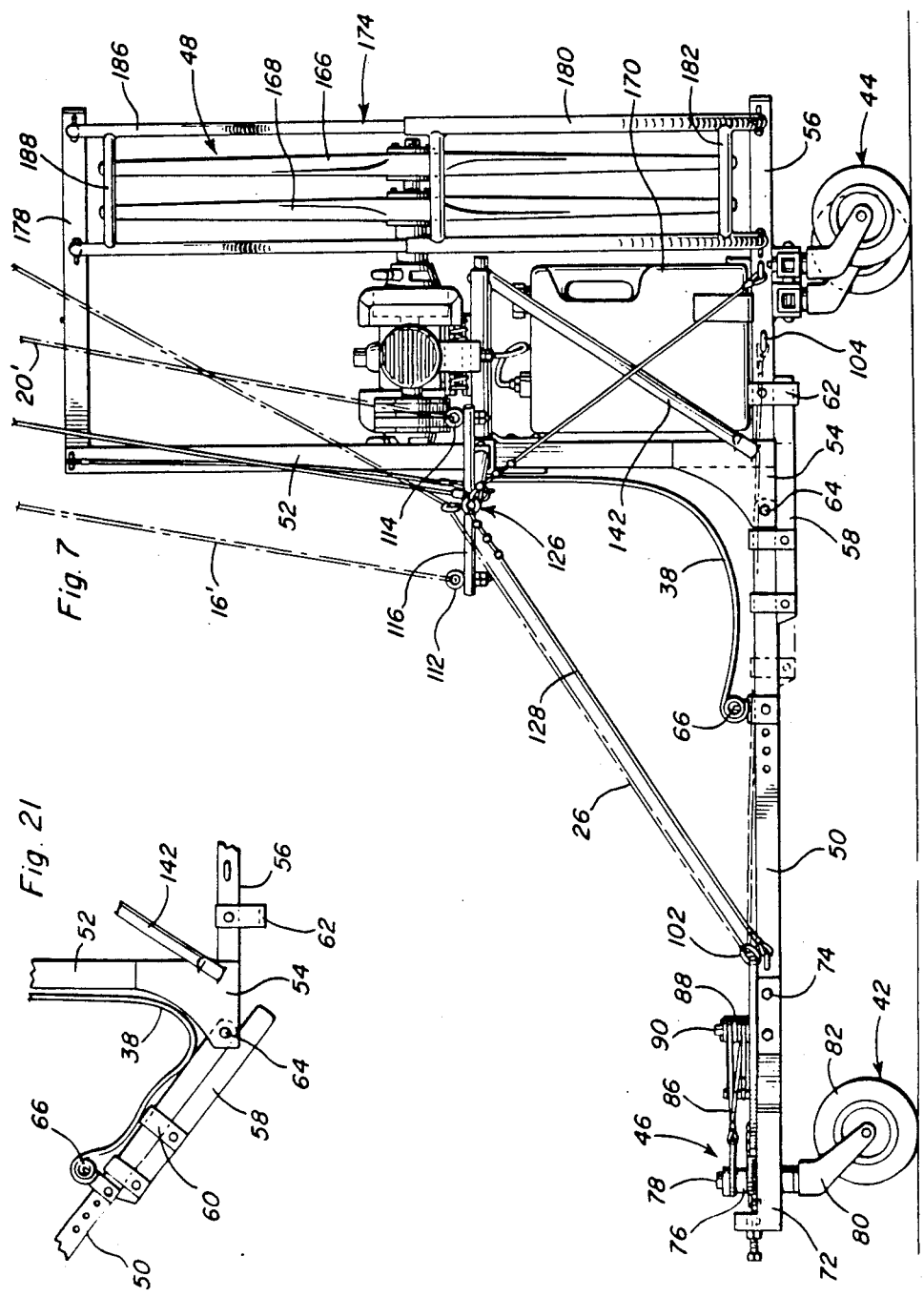

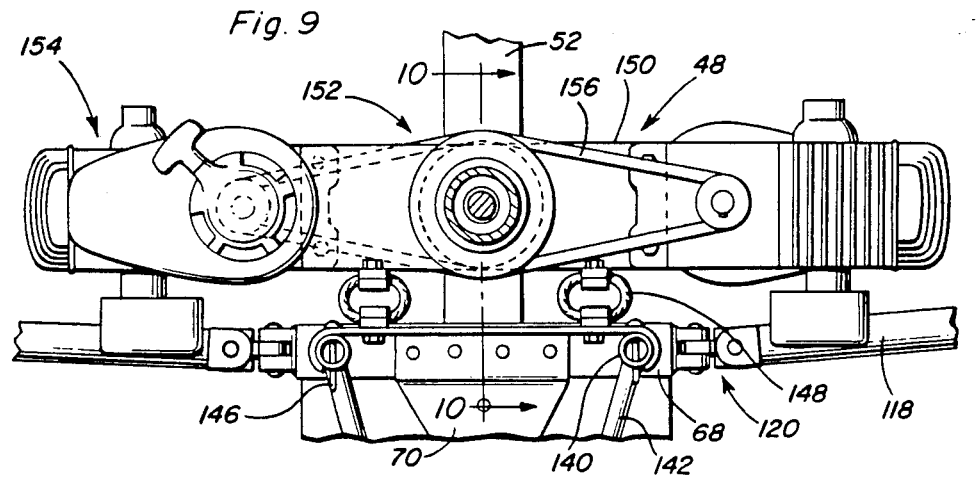
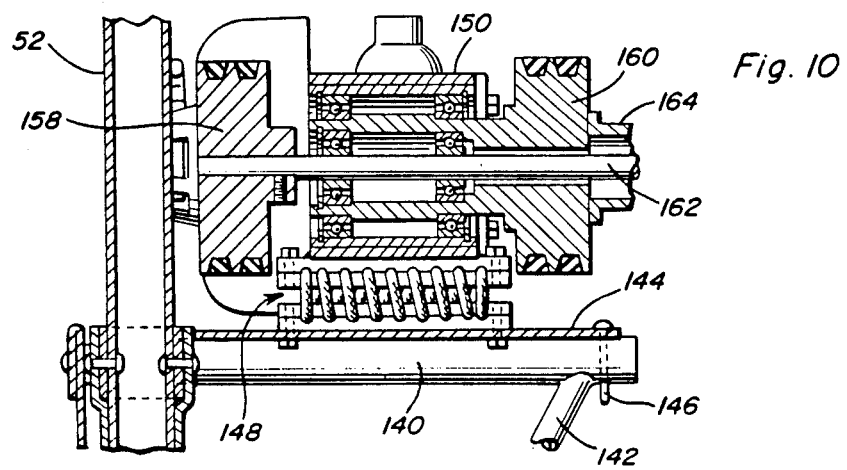
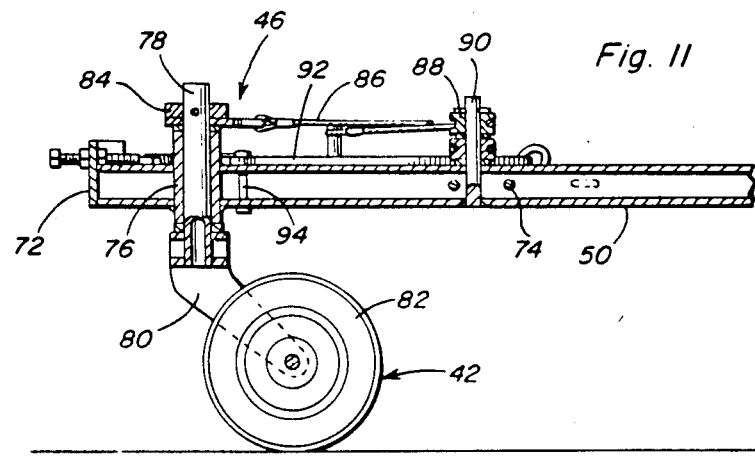

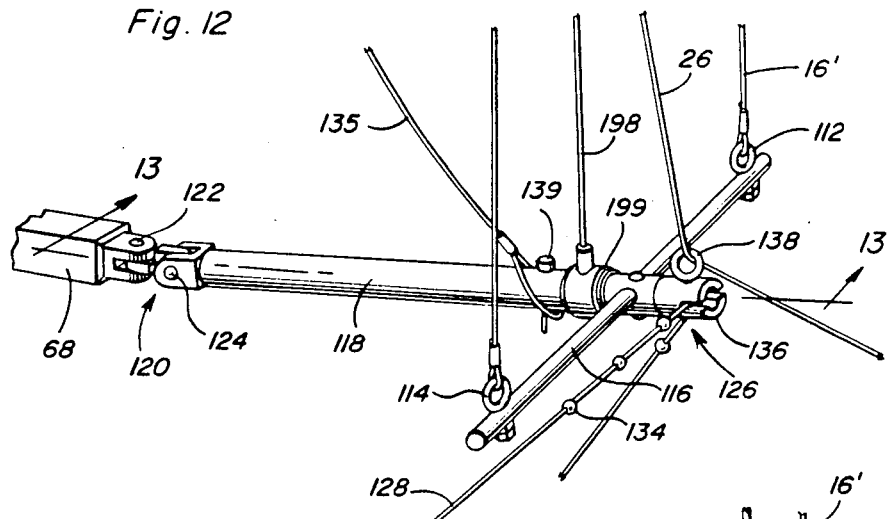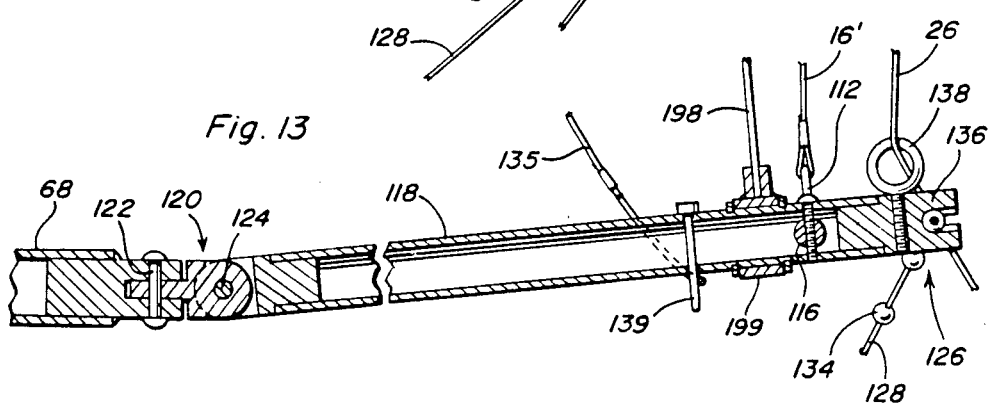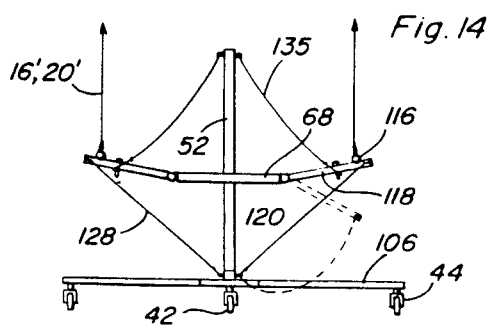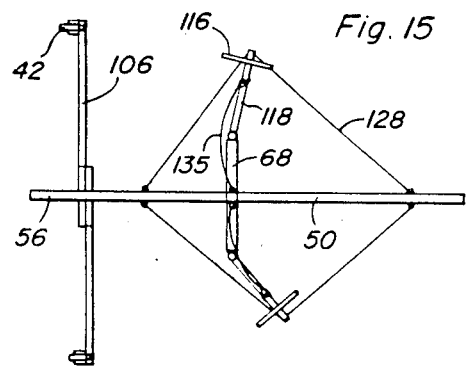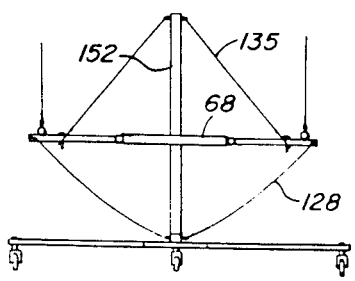

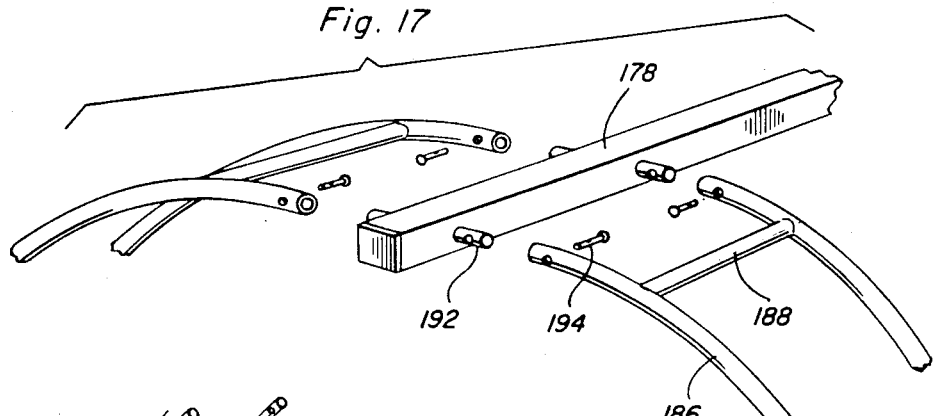
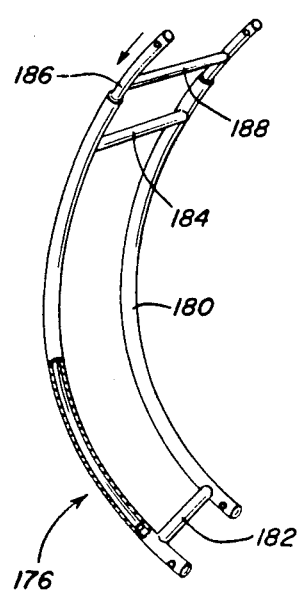
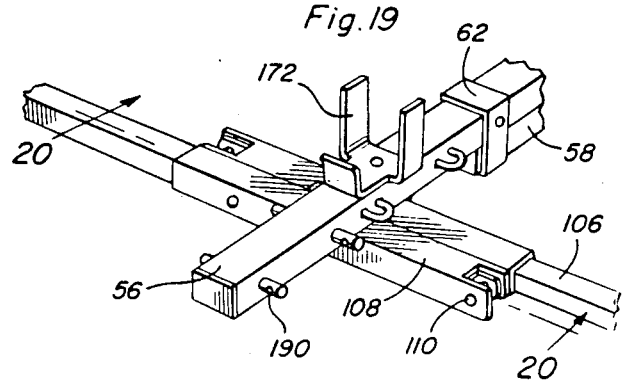
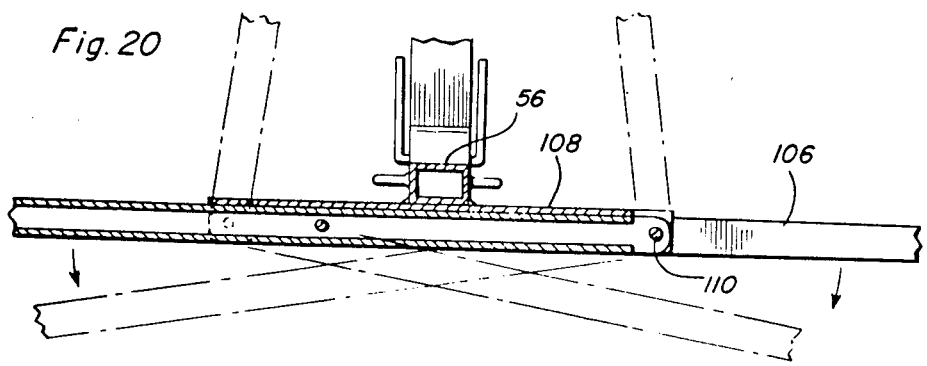

POWERED AIRFOIL CANOPY AIRCRAFT

BACKGROUND OF THE INVENTION

This invention relates generally to a class of lightweight aircraft, referred to as "ultralights" and more particularly to an aircraft receiving its lift from an inflatable canopy type of flexible airfoil wing.

Ultralight aircraft more commonly featured today for recreational and sporting purposes involve use of relatively rigid wings as part of a glider type airframe mounting a lightweight powered propeller. Such aircraft although exceedingly light in weight are dimensionally extensive and bulky so as to create ground transport difficulties and storage problems. Further, such aircraft require highly skilled pilots and are subject to stall, spin and other uncontrollable conditions in the hands of inexperienced pilots.

In comparison with the foregoing types of "ultralights", a powered flight vehicle having a flexible airfoil canopy associated therewith provides a substantially smaller aircraft that is collapsible to a more compact condition for ground transport and storage. Such aircraft are already known as disclosed, for example, in a published U.S. Air Force Technical Report AFFDL-72-73, entitled "Parafoil Powered Flight Performance", authored by John D. Nicolaides. This type of aircraft has, however, been found to have various control and handling problems and requires towing by a land vehicle for take-off. Accordingly, the inflated airfoil canopy type of aircraft has not been heretofore seriously considered as as a marketable "ultralight".

It is therefore an important object of the present invention to provide a powered flight vehicle having a ram air inflatable, airfoil wing canopy, as an "ultralight" not subject to unsafe flight hazards such as stall and spin.

A further object in accordance with the foregoing object is to provide an "ultralight" aircraft that is so easy and simple to pilot as to enable safe solo flight by relatively inexperienced persons since pitch and roll controls are not required.

Yet another object of the present invention is to provide a flight vehicle construction for the foregoing type of "ultralight" aircraft that is collapsible and foldable into a most compact form.

A still further object is to provide the foregoing type of aircraft that is readily easy to launch or condition for take-off without towing, and easy or simple to control during flight including directional steering, climb and descent.

SUMMARY OF THE INVENTION

In accordance with the present invention, a three wheel flight vehicle is associated with a ram air inflated type of rectangular airfoil canopy as disclosed in U.S. Pat. No. 3,724,789 to Snyder, having chordwise extending air cells. The air cells are separated by ribs and are open at a leading edge of the canopy formed by a spanwise intake face from which the canopy fabric on the top and bottom surfaces taper along airfoil curvature to the trailing edge. Load suspension lines extend from the leading edge and from the bottom surface at locations intermediate the leading and trailing edges to two laterally spaced pairs of longitudinally spaced pivot anchors on the flight vehicle. Each pair of longitudinally spaced pivot anchors are mounted on an anchor arm to establish a geometrical relationship between the vehicle and inflated canopy through the load lines which produces an automatic change in attitude of the canopy between take-off and level flight positions to establish a stable airborne supporting flight frame. In the take-off attitude, the canopy is in a position of optimum angle of attack to inflate and lift the canopy from ground behind the vehicle to an overhead flight position. Thus, canopy inflation and lift is properly maximized during take-off as the forward propelling thrust imparted to the vehicle accelerates it to a constant forward cruising speed of 25 MPH, for example. As the vehicle becomes airborne and reaches its constant cruising speed, the attitude of the canopy relative to ground changes in dependence on the forward thrust exerted on the vehicle. Because of lift and drag forces aerodynamically produced on the canopy and the force moment relationships associated with the aircraft geometry, the possibility of stall and spin is almost non-existent. By controlling the magnitude of the forward thrust, climb (or descent) of the aircraft may be regulated until a balance is achieved between forward thrust, gravitational load and aerodynamic forces on the canopy causing it to assume a level flight attitude at the constant cruising speed aforementioned.

Forward thrust is exclusively imparted to the vehicle during both take-off and flight, with lateral thrust components balanced, by counter-rotating pusher propellers independently driven through coaxial transmission drive trains connected to separate internal combustion engines in accordance with one embodiment of the invention. Thus, joint throttle control of the engines may be utilized to change the forward thrust imparted to the vehicle to regulate climb or descent, and to achieve and maintain level flight.

Ground steering control of the vehicle frame is effected through a front end mounted dirigible wheel assembly, while a pair of rear swivelly mounted caster wheels automatically change the forward direction of ground supported travel in response to the lateral force of cross winds. Take-off in the direction of prevailing winds is thereby assured for maintaining full canopy inflation during the self-propelled take-off phase of operation. Front end ground steering control is effected through a pair of foot actuated steering levers mounted on the vehicle frame. The same steering control levers are also operative through steering control lines to directionally control forward motion of the canopy during flight by deflection of spanwise opposite portions of the trailing edge of the canopy. Pilot confusion and error is thereby minimized, by utilizing the common steering controls. The canopy steering control is independent of the aforementioned spaced anchors for the canopy load lines from which the vehicle frame is suspended during flight.

The change in canopy attitude aforementioned, will not only depend on forward thrust control, but also on the optimum location of the vehicle load or its center of gravity relative to the two pivot anchors at which the canopy load lines are attached to the vehicle. Locational adjustment of the vehicle center of gravity is effected prior to take-off in accordance with the weight of the pilot by preselecting the adjusted positions at which the anchor arms are locked to the vehicle frame during flight in a plane parallel to the longitudinally axis of the frame.

In accordance with one embodiment of the invention, the anchor arms are fixed to the ends of positioning lever elements connected by double hinges to a fixed cross bar mounted on a vertical mast forming part of the vehicle frame which includes an elongated frame member extending parallel to the longitudinal axis of the vehicle. The double hinges establish vertical adjustment axes about which the anchor arms are pivotally displaced horizontally to the adjusted locations set by releasable engagement with frame anchored flexible cable loops at preselected locking locations. The double hinges also establish horizontal axes about which the positioning lever elements pivotally elevate the anchor arms to the operative positions in response to tension in the load lines produced by lift forces on the canopy. In such operative positions, the cable loops become taut to lock the anchor arms at the adjusted locations and limit extension of the positioning lever elements from retracted positions.

The rearwardly mounted caster wheels aforementioned, are carried on legs pivotally extended by more than 180 from a pair of cross channel members fixed to a pivotally foldable rear end section of the longitudinal frame member. Thus, the caster wheels will be closely spaced from each other, with the legs in retracted positions abutting parallel mounting bars projecting rearwardly from the aforementioned cross bar of the vehicle frame when folded into compact form.

The mounting bars projecting rearwardly from the cross bar of an erected vehicle frame, support a platform with shock absorbers for mounting of the two engines, the transmission and the counter-rotating propellers aforementioned as a powered thrust producing unit. The unit is thereby also readily disassembled from the erected vehicle frame which may then be folded into a compact condition as aforementioned. Further, a collapsible type of open-frame propeller guard is readily assembled onto the erected vehicle frame at its rear end in protective relation to the counter-rotating propellers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a rear end perspective view of the flight vehicle portion of the aircraft shown in FIG. 1.

FIG. 7 is a side elevational view of the flight vehicle portion of the aircraft.

FIG. 9 is a partial end section view taken substantially through a plane indicated by section line 9—9 in FIG. 8.

FIG. 10 is a partial section view taken substantially through a plane indicated by section line 10—10 in FIG. 9.

FIG. 11 is a partial section view taken substantially through a plane indicated by section line 11—11 in FIG. 8.

FIG. 12 is an enlarged partial perspective view of a load line anchor positioning and locking portion of the flight vehicle.

FIG. 13 is an enlarged sectional view taken substantially through a plane indicated by section line 13—13 in FIG. 12.

FIGS. 14, 15 and 16 are simplified end and top views of the flight vehicle showing the load line anchor positioning and locking actions associated with the structural arrangement of FIGS. 12 and 13.

FIG. 17 is a perspective view of disassembled portions of the propeller guard associated with the flight vehicle shown in FIGS. 1, 3, 7 and 8.

FIG. 18 is a perspective view of a collapsed section of the propeller guard.

FIG. 19 is a partial perspective view of a rear end frame section of the flight vehicle.

FIG. 20 is a partial sectional view taken substantially through a plane indicated by section line 20—20 in FIG. 19.

FIG. 21 is a side elevational view of a portion of the flight vehicle shown in FIG. 7, in a partially folded condition.

DETAILED DESCRIPTION OF PREFERRED EMBODIMENT

Figure 1:
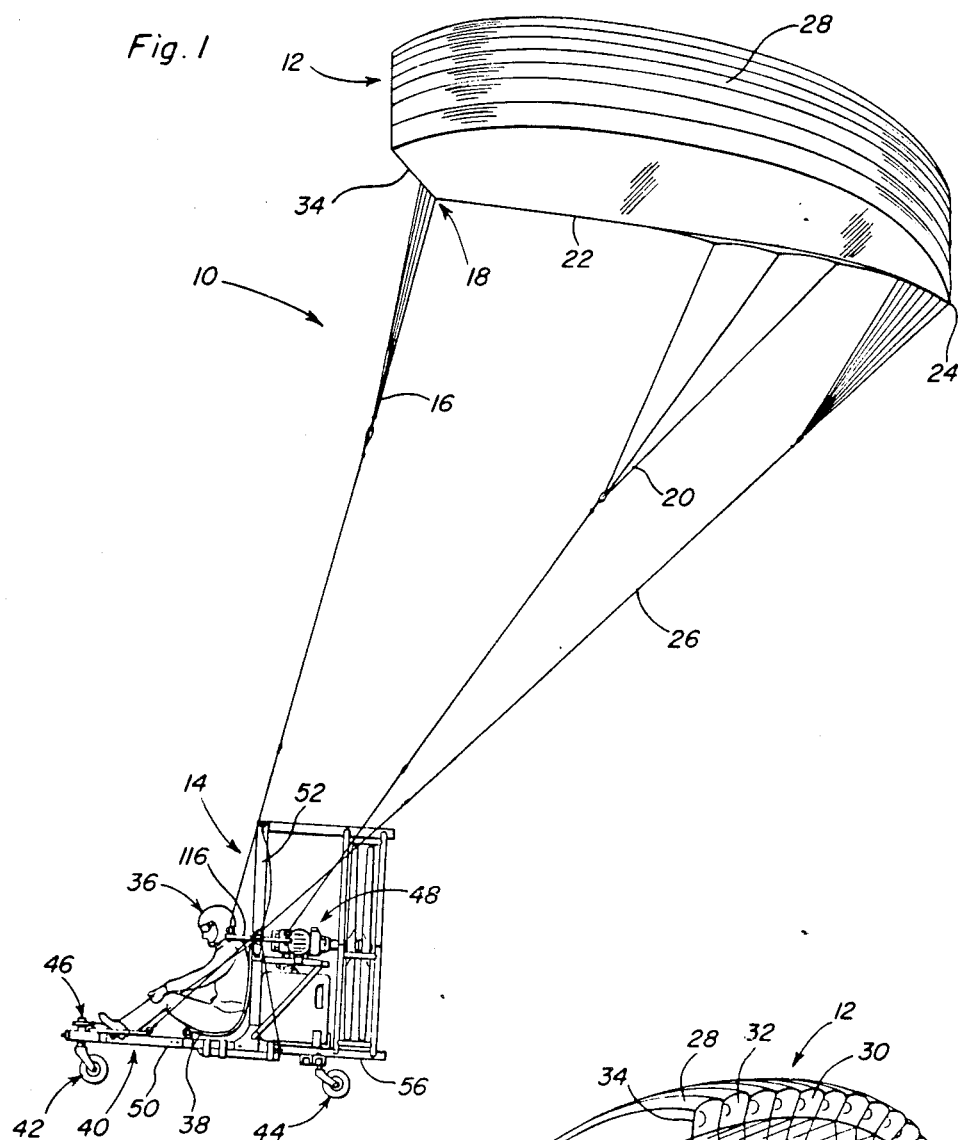
FIG. 1 is a side elevational view of a typical aircraft constructed in accordance with the present invention, during flight.

Referring now to the drawings in detail, FIG. 1 generally illustrates an aircraft constructed in accordance with the present invention denoted by reference numeral 10, the aircraft being shown in flight. The aircraft consists of a flexible wing portion generally referred to by reference numeral 12 and a pilot supporting flight vehicle generally denoted by reference numeral 14. At least two groups of spanwise spaced load suspension lines interconnect the vehicle 14 with the leading edge portion 18 of the wing portion 12 while at least two groups of load lines 20 connect the vehicle 14 to the bottom surface 22 at locations intermediate the leading edge portion 18 and the trailing edge 24. Also extending from the flight vehicle 14 to the trailing edge 24 of the wing portion are a pair of directional control lines 26.

Figure 2:
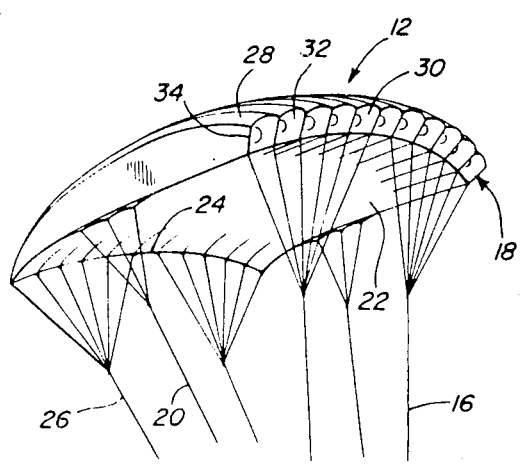
FIG. 2 is a perspective view of the inflated flexible canopy wing portion of the aircraft shown in FIG. 1.

As more clearly seen in FIG. 2, the flexbile wing portion 12 of the aircraft is a ram air inflated type of airfoil canopy made of a flexible fabric such as nylon. The canopy includes a top surface skin 28 that extends in a chordwise direction along an airfoil curvature from the leading edge portion 18 to the trailing edge 24 when in an inflated condition. The canopy is inflated by the inflow of air into a plurality of air cells 30 that extend chordwise and are separated by ribs 32. The foregoing type of ram air inflated canopy is generally well known in the art except for the particular locations at which the load lines 16 and 20 are connected thereto in chordwise spaced relationship in order to establish a certain critical geometrical relationship with the flight vehicle 14 as will be explained in detail hereinafter. Furthermore, the canopy at the leading edge portion 18 has an air intake face 34 forming the open ends of the canopy inflating cells 30. The air intake face 34 also forms part of the geometrical relationship aforementioned to enhance canopy inflation during the take-off phase of operation as will also be explained hereinafter in detail.

With continued reference to FIG. 1, the flight vehicle 14 as shown supports a single pilot 36 on a canvas seat 38 anchored to a vehicle frame assembly generally referred to by reference numeral 40. The frame assembly includes a forward, dirigible ground supporting wheel assembly 42 and a pair of rear swivelly mounted caster wheel assemblies 44 to form a 3-wheel ground support for the vehicle. A steering control assembly generally referred to by reference numeral 46 is mounted on the front end portion of the vehicle frame and serves to both effect ground steering and in-flight directional control of the canopy through the directional control lines 26 as will be explained hereinafter in detail. Mounted on the rear end portion of the vehicle frame is a forward thrust producing unit generally referred to by reference numeral 48. In addition to the steering control over the aircraft, the pilot 36 controls forward thrust for climb, level flight and descent purposes.

Figure 8:
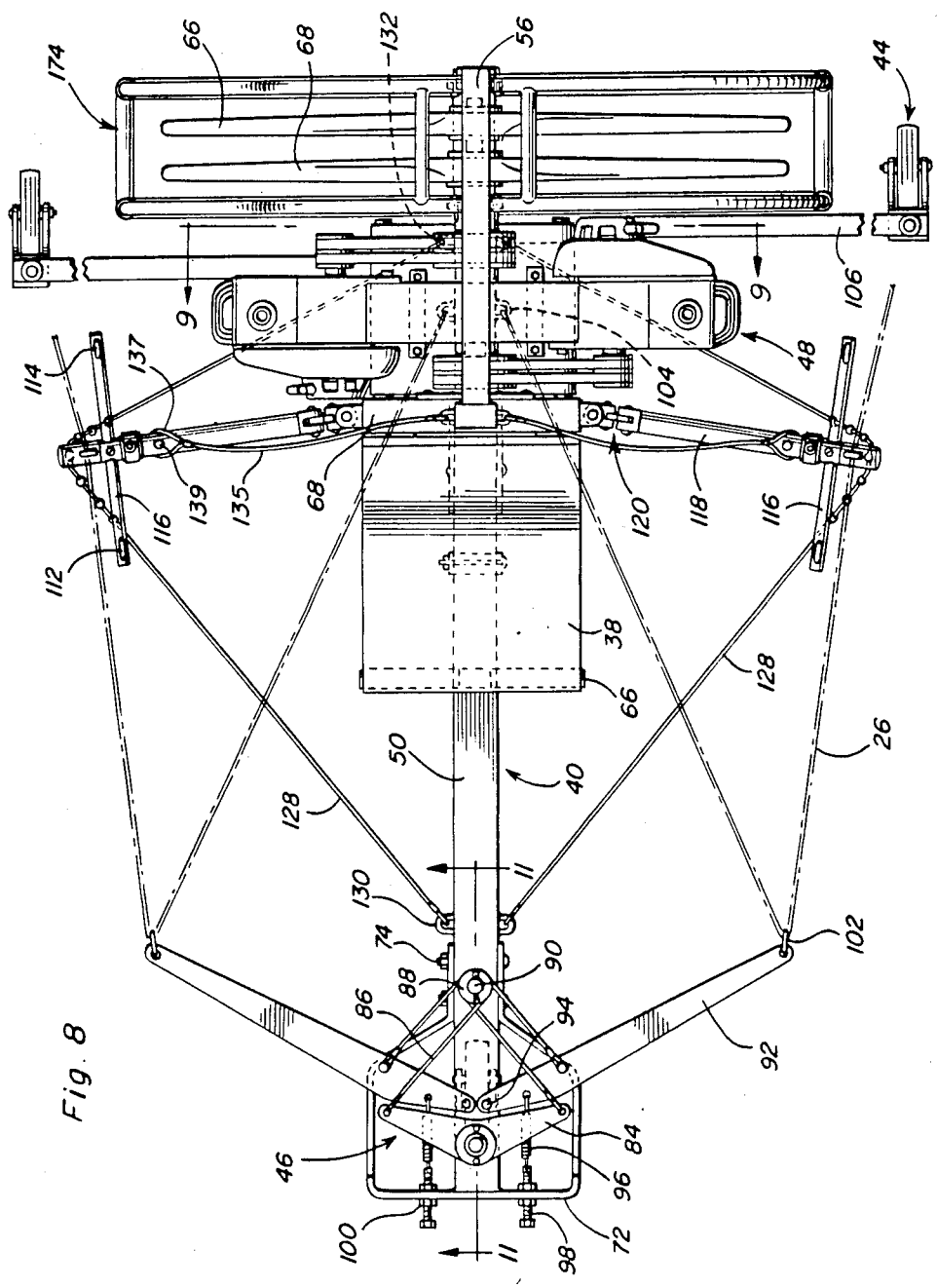
FIG. 8 is a top plan view of the flight vehicle shown in FIG. 7.

FIGS. 3, 7 and 8 illustrate in detail the vehicle frame assembly in an erected, air worthy condition. The frame assembly includes an elongated tubular frame member 50 having a front end portion on which the steering control assembly 46 is mounted. The other longitudinal end portion of the frame member 50 is pivotally connected to a tubular mast 52 by means of a pair of side gusset plates 54. The gusset plates are rigidly connected as by welding to a rearwardly extending, rear end tubular frame section 56. In the erected condition of the vehicle frame assembly, the rear end frame section 56 is longitudinally aligned with the frame member 50 as shown in FIGS. 3 and 7. The frame member 50 and rear end frame section 56 are locked in this aligned relationship by means of an underlying lock bar 58 that is slidably mounted on the frame member 50 by means of a pair of slide straps 60 fastened to the lock bar 58. The lock bar is slidably displaced in a rearward direction for reception through a loop strap 62 fastened to the rear end frame section 56. The lock bar when slidably displaced in a forward direction to the dotted line position shown in FIG. 7, permits folding of the frame sections 50 and 56 about the interconnecting pivot 64 as shown in FIG. 21. In order to accommodate such folding of the frame sections, the pilot supporting seat 38 is made of a flexible canvas material anchored at opposite ends to the forward frame member 50 by means of an adjustably positioned anchor bar 66 while the other end of the canvas seat member 38 is anchored to the mast 52 by means of a tubular cross bar member 68. The cross bar is rigidly connected to the mast by a pair of gusset plates 70 and extends laterally therefrom generally perpendicular to the common longitudinal axis of the frame sections 50 and 56 which are parallel to the longitudinal axis of the vehicle frame.

Referring now to FIGS. 8 and 11 in particular, the steering control assembly 46 at the front end portion of the vehicle frame includes a frame loop element 72 fixedly attached to the forward end of the frame member 50 as by welding and by fasteners 74 to the sides of the frame member 50 in rearward spaced relationship to the forward end. A tubular bearing sleeve 76 is fixed as by welding to the frame member 50 and extends vertically therethrough for rotationally supporting a steering shaft 78 to which the dirigible wheel assembly 42 is connected. Thus, the lower end of the steering shaft 78 is rigidly connected to a wheel mounting frame 80 which rotationally supports the front wheel 82 below the frame member 50. A pair of interconnected steering control arms 84 are rigidly connected to the upper end portion of the steering shaft 78 and extend laterally therefrom within the confines of the frame element 72 as more clearly seen in FIG. 8. The laterally outer ends of the steering control arms 84 have a pair of actuating cables 86 connected thereto. The cables 86 are entrained about a pair of pulleys 88 rotatably mounted on a pulley spindle 90 affixed to the frame member 50 in rearward spaced relationship to the steering shaft 78. The cables 86 entrained about the pulleys 88 extend therefrom forwardly for connection to a pair of steering control levers 92 which are pivotally mounted on the frame member 50 independently of each other by means of a pair of pivots 94. The steering control levers 92 extend at a rearwardly inclined angle to the frame member 50 beyond the frame element 72 and are spaced forwardly of the pilot supporting seat 38 a sufficient distance to comfortably support the feet of the pilot as shown in FIG. 1. Each of the steering control levers 92 is connected to one end of a coil spring 96. The other end of the coil spring 96 is connected to an adjustment screw element 98 threadedly mounted through nuts 100 fixed to the frame element 72 as more clearly seen in FIG. 8. The ends of the adjustment screws 98 are provided with knurled knobs or the like so that the tensions of the springs 96 may be adjusted in order to preset a centering bias on the wheel assembly 42 yieldably maintaining straight ahead travel on the ground. It will be apparent therefore that pivotal displacement of the control levers 92 by foot applied pressure will correspondently transmit displacing forces to the control arms 84 in order to angularly displace the steering shaft 78 of the dirigible wheel assembly 42 for ground steering purposes. The laterally outer ends of the control levers 92 mount guide rings 102 through which the directional control cables 26 extend to the trailing edge portions of the canopy 12. The directional control cables 26 are anchored to the vehicle frame by anchor elements 104 on opposite sides of the rear end frame section 56. Thus, the same pivotal movements imparted to the directional control levers 96 for effecting ground steering through the steering control arms 84 will also be operative through the directional control lines 26 to effect deflection of spanwise spaced portions of the trailing edge 24 of the canopy in order to control aerodynamic steering of the canopy and the aircraft while it is airborne.

Support for the vehicle frame assembly 40 on the ground is provided by the front dirigible wheel assembly 42 and the rear wheel assemblies 44 as aforementioned. Each of the rear wheel assemblies 44 is of a conventional caster wheel construction swivelly mounted at the end of a tubular leg member 106 as more clearly seen in FIGS. 3 and 8. The caster wheel assemblies 44 are thereby mounted a substantial distance laterally of the elongated frame section 56 and are connected thereto by abutting, inverted channel-shaped members 108 secured as by welding to the underside of the rear end frame section 56 from which the channel-shaped members extend laterally a relatively short distance as compared to the leg elements 106. Pivot connections 110 are established at one of the ends of each of the channel-shaped members 108 on opposite sides of the rear end frame section 56 through which the leg elements 106 are connected to the channel-shaped members and pivotally displaced relative thereto from the extended positions shown in FIGS. 3, 8 and 19 to folded positions as shown by dotted line in FIGS. 20 and 22. Such pivotal displacement of the leg elements 106 from the extended to the folded positions involve approximately 270° rotation since each leg element 106 extends from the end of its channel-shaped member 108 opposite the end to which it is pivotally connected by pivotal connection 110. Adequate cantilever support for the leg elements in the extended positions is thereby provided by the channel-shaped members 108. In the extended positions of the leg elements 106, the caster wheel assemblies 44 will not only provide firm and stabilized support for the flight vehicle on the ground in combination with the front dirigible wheel assembly 42, but will also automatically respond to cross wind forces in changing the direction of forward movement of the flight vehicle into the direction of the prevailing winds. Canopy inflation during take-off is thereby assured.

Referring now to FIGS. 7, 8, 12 and 13 in particular, each pair of load lines 16 and 20 are pivotally connected through cables 16' and 20' to the vehicle by anchors 112 and 114 mounted in spaced relationship to each other adjacent opposite ends of an anchor arm 116. Two pairs of anchor arms 116 are positioned on opposite lateral sides of the longitudinal axis of the vehicle frame assembly by positioning lever elements 118 connected by double hinge assemblies 120 to the opposite ends of the cross bar member 68. Each double hinge assembly 120 as more clearly seen in FIGS. 12 and 13, establishes a vertical adjustment axis fixed to the vehicle frame assembly through pivot pin 122 about which a positioning lever element 118 is displaceable in a plane in fixed parallel relation to the longitudinal axis of the vehicle frame. A pivot pin 124 of the double hinge assembly fixed to the positioning element 118 establishes a second axis about which the positioning lever element 118 is displaceable in a generally vertical plane. Displacement of the positioning lever element 118 about the axis through pivot pin 124 occurs in response to aerodynamic lift forces exerted on the canopy and transmitted to the anchor arm 116 through the load lines 16 and 20. Upon displacement of the positioning lever elements 118 to limit positions in response to tensioning of the load lines thereby establishes operative positions for the anchor arms corresponding to the geometrical relationship between the flight vehicle 14 and the canopy 12. The operative position of the anchor arm 116 will also depend upon the adjusted angular position of the positioning lever element 118 about the adjustment axis through pivot pin 122. Selection of the longitudinal location of the anchor arm 116 in its operative position relative to the vehicle frame is effected through a locking arrangement on each lateral side of the vehicle frame, generally referred to by reference numeral 126 as more clearly seen in FIGS. 12 and 13.

The adjustable locking mechanism 126 includes a loop cable 128 anchored at opposite ends by anchors 130 and 132 to the forward frame member 50 and the rear end frame section 56 as more clearly seen in FIG. 8. Locking formations 134 with appropriate indicia formed thereon, such as color coding, are mounted in spaced relationship on the loop cable 128. The laterally outer end of each positioning lever element 118 has a slotted lock member 136 secured thereto adapted to receive one of the locking formations 134 therein as more clearly seen in FIG. 13. Accordingly, the positioning lever element 118 will be secured at a preselected location to the loop cable 128. Prior to flight, the loop cables 128 will be in a slack condition with the positioning lever elements 118 held elevated by cables 135 anchored to the top of mast 52. In such positions of the positioning elements 118, the loop ends 137 of the cables 135 slidable on the positioning elements are hooked onto retractable pins 139 as more clearly seen in FIG. 8. The cables 135 will then be taut as shown in FIG. 16. When the load lines 16 and 20 become tensioned as a result of aerodynamic lift exerted on the canopy 12, an upward pull is exerted by the load lines on the positioning lever elements 118 causing upward displacement thereof to the limit positions at which the loop cables 128 become taut and the cables 135 slacken as shown in FIG. 14. Depending upon the preselected location at which the loop cables 128 are locked to the ends of the positioning lever elements 118, the taut loop cables 128 will predetermine the angular positions of the positioning lever elements 118 as shown in FIG. 15. Thus, the adjustable lock mechanisms 126 enable one to change the location of the vehicle center of gravity relative to the anchor arms 116 in accordance with the weight of the pilot. Such adjustment of the location of the center gravity of the flight vehicle load relative to the anchor points at which the canopy load lines are connected thereto was found necessary to maintain the optimum geometrical relationships for safe flight in accordance with the present invention.

The locking members 136 associated with each of the adjustable locking mechanism 126, as more clearly seen in FIGS. 12, and 13, also mount a guide ring 138 through which the directional control lines 26 extend to the canopy from the steering control assembly 46. The guide ring 138 and the load line anchors 112 and 114 will all be disposed in adjusted positions laterally of the pilot with the pilot supporting seat 38 located on the front end frame member 50 forwardly of the mast 52 to which the cross bar 68 is connected for support of the anchor positioning and adjustable locking facilities. The forward thrust producing unit 48 aforementioned is mounted on the vehicle frame assembly rearwardly of the mast 52 by means of a pair of support bars 140 secured to and projecting from the cross bar 68 in parallel spaced relationship to each other on opposite sides of the longitudinal axis of the vehicle frame assembly. As more clearly seen in FIG. 3, the support bars are braced by rods 142 secured at their lower ends to the gusset plates 54 interconnecting the rear end frame section 56 and the mast 52. As more clearly seen in FIGS. 9 and 10, the forward thrust producing unit 48 is assemblied on a supporting platform 144 slidably received over the support bars 140 and locked thereto by locking elements 146. A pair of shock absorbers 148 mount a bearing block 150 associated with a transmission 152 drivingly connected to a pair of lightweight, internal combustion engines 154 of a commercially available type. Drive shafts extend from the internal combustion engines 154 in opposite directions parallel to the longitudinal axis of the vehicle frame assembly and are drivingly connected by endless pulley belts 156 of the transmission 152 to driven pulley wheels 158 and 160 rotatably mounted in coaxial relationship on the bearing block 150. The forward pulley wheel 158 is connected to a power shaft 162 that extends through a coaxial tubular power shaft 164 connected to the rearward pulley wheel 160 as more clearly seen in FIG. 10. The power shafts 162 and 164 are accordingly rotated in opposite rotational directions and are respectively connected to counter-rotating pusher propellers 166 and 168 disposed above the rear end portion of the rear end frame section

56 as more clearly seen in FIG. 7. The propellers 166 and 168 by virtue of their counter rotating relationship and connection to the coaxial pulleys 158 and 160 of the transmission 152, will balance side thrusts produced during powered rotation. Fuel for operating the two engines 154 is supplied from a fuel tank 170 mounted on the rear end frame section 56 below the supporting platform 144 and adjacent to the mast 52 forwardly of the rotating propellers 166 and 168 as more clearly seen in FIG. 7. Fuel tank holding hardware 172 may be provided on the rear end frame section 56 as more clearly seen in FIG. 19.

Referring now to FIGS. 3, 17 and 18 in particular, an open frame type of propeller guard generally referred to by reference numeral 174 is provided. The propeller guard includes two generally semi-circular sections 176 that are extended from collapsible condition for assembly onto the vehicle frame through the rear end frame section 56 and a parallel upper support bar 178 rigidly fastened to and extending rearwardly from the upper end of the mast 52. Each section 176 of the propeller guard includes a pair of arcuate-shaped, outer tubular rods 180 interconnected adjacent opposite ends by connecting bars 182 and 184. Parallel spaced, inner arcuate rods 186 interconnected by connecting bars 188 are extended from retracted positions as shown in FIG. 18 to the extended positions as shown in FIG. 3 in order to accommodate assembly of the propeller guard onto the vehicle frame. The open lower ends of the outer tubular bars 180 are plugged onto pins 190 projecting from opposite sides of the rear end frame section 56 as shown in FIG. 19 whereas the open upper ends of the inner bars 186 are plugged onto pins projecting from the opposite sides of the support bar 178 as shown in FIG. 17. When so assembled, removable fasteners 194 lock the arcuate bars 180 and 186 to the pins 190 and 192 in order to complete a rigid, open framework type of propeller guard assembly.

Figure 4:
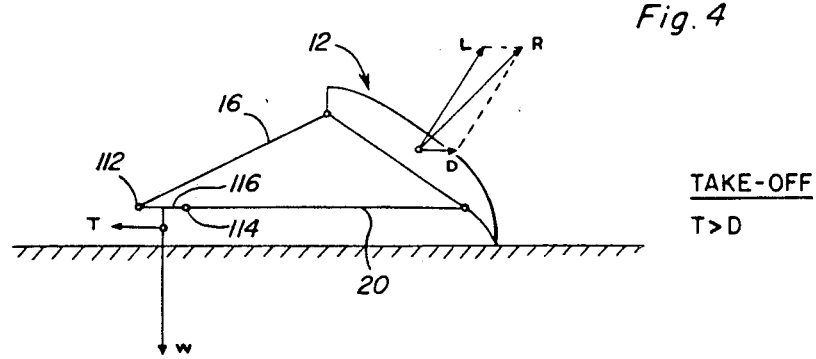

It will be apparent from the foregoing description that pilot operated throttle controls are associated with the engines 154 of the forward thrust producing unit 48 so that the forward thrust exerted by the unit 48 on the flight vehicle 14 may be regulated, such forward thrust being represented by thrust vectors T in FIGS. 4, 5, 5A and 6. The forward thrust will accordingly accelerate the flight vehicle 14 to a constant cruising speed V from the take-off attitude of the canopy having an angle of attack determined by the relative lengths of the load line connections between the canopy and the vehicle frame. Thus, in order to launch the aircraft, the unfolded canopy need only be raised from the ground by assisting personnel to an elevated position approximating the take-off attitude as shown in FIG. 4.

Figure 1A:
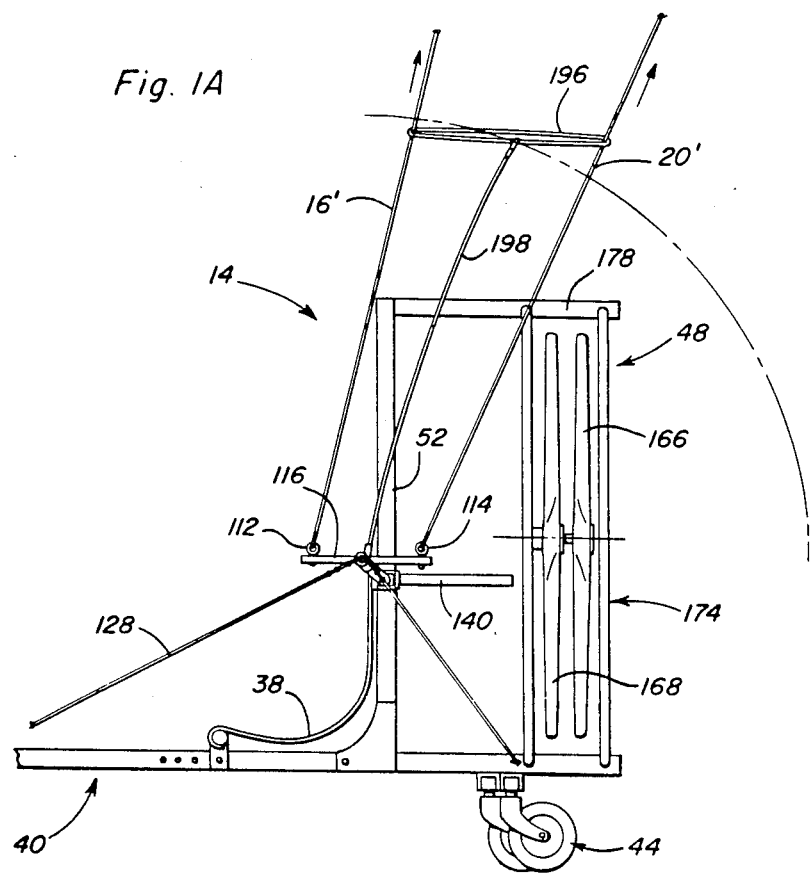
FIG 1A is an enlarged partial side elevational view of a portion of the arrangement of FIG. 1, shown in greater detail.

As more clearly seen in FIG. 1A, the cable connections 16' and 20' between anchors on arm 116 and the canopy extend through guide loops 196 secured to the outer ends of flexible rods or poles 198. The rods 198 are mounted for angular displacement on the positioning elements 118 adjacent to the anchor arms 116 by swivel collars 199 as more clearly seen in FIG. 13. Thus, the canopy load lines when slackened are maintained clear of the propellers since the travel arc of the guide loops 196 at the ends of rods 198 are well beyond the propeller guard 174.

Figure 6:
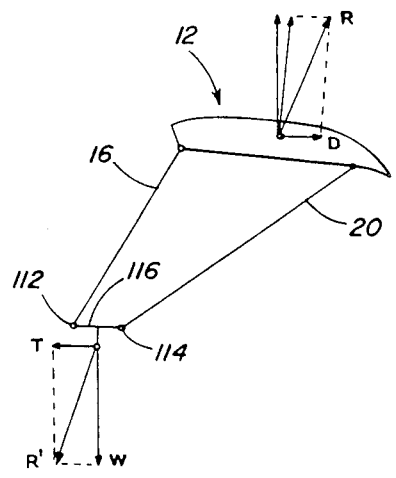
FIGS. 4, 5, 5A and 6 are schematic side views and vector diagrams associated with the aircraft of FIG. 1 during take-off, climb, descent, and level flight phases of operation.

Operation of the thrust producing unit 48 on the flight vehicle will forwardly accelerate the wheeled flight vehicle on the ground to cause immediate inflation of the canopy in its take-off attitude as shown in FIG. 4, from which the canopy is pivotally displaced relative to the forwardly moving vehicle as it begins its climb. Forward movement of the aircraft produces a predetermined lift drag ratio of approximately 3:1 on the airfoil canopy represented by the lift vectors L and drag vectors D. During take-off operation, the lift vector L is relatively high because of the high angle of attack position of the canopy in the take-off attitude with a correspondingly high drag vector D. The aerodynamic resultant force R on the canopy during the take-off phase will accordingly cause pivotal displacement of the canopy toward the climb attitude shown in FIG. 5, since the thrust vector T is greater than the drag vector D. As the lift vector rotates toward the vertical in response to the angular change in attitude of the canopy relative to the ground, the vertical lift component $L_v$ is maintained greater than that of the load vector W as the magnitude of the thrust vector T approaches that of the drag vector D. The canopy assumes a steady state, level flight attitude as shown on FIG. 6 when both the drag vector D and the vertical lift component $L_v$ are equal in magnitude to the forward thrust vector T and the load vector W, respectively. Level flight is sustained by forward movement at the constant forward cruising speed under control of the balancing thrust T so as to maintain the force re R and R′ equal as shown in FIG. 6.

Figure 5:
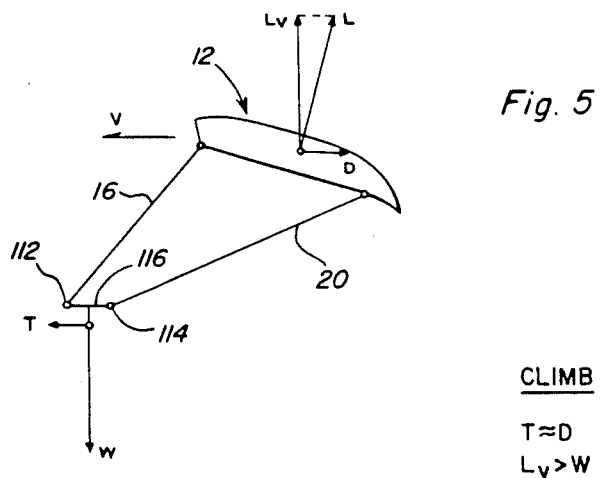
Figure 5A:
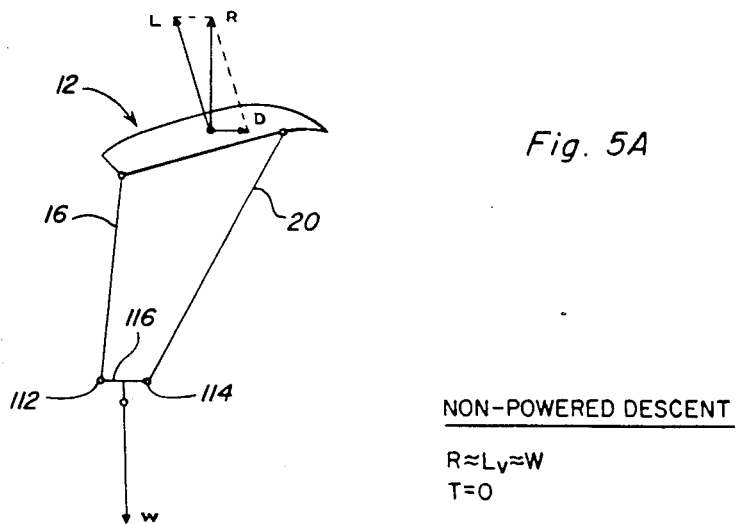

FIG. 5A shows the glide attitude of canopy 12 during non-powered descent wherein the thrust is equal to zero and the aerodynamic resultant R of the lift vector and drag vector D is vertical and equal in magnitude to the load vector W. Thus, a safe rate of descent may be obtained by reducing thrust from the level flight magnitude depicted in FIG. 6 toward zero. Any increase or decrease in thrust from such level flight magnitude will cause a corresponding change in canopy attitude toward positions respectively shown in FIGS. 5 and 5A without changing the forward cruising speed because of the geometrical relationships described including the shorter load line connection from anchor point 112 to the leading edge of the canopy, the longer load line connection from the anchor point 114 to the canopy at a location rearwardly spaced from the leading edge, the longitudinal spacing of anchor arm 116 between the anchor points and the adjusted location of the load center of the vehicle relative to the anchor arm 116.

Figure 22:
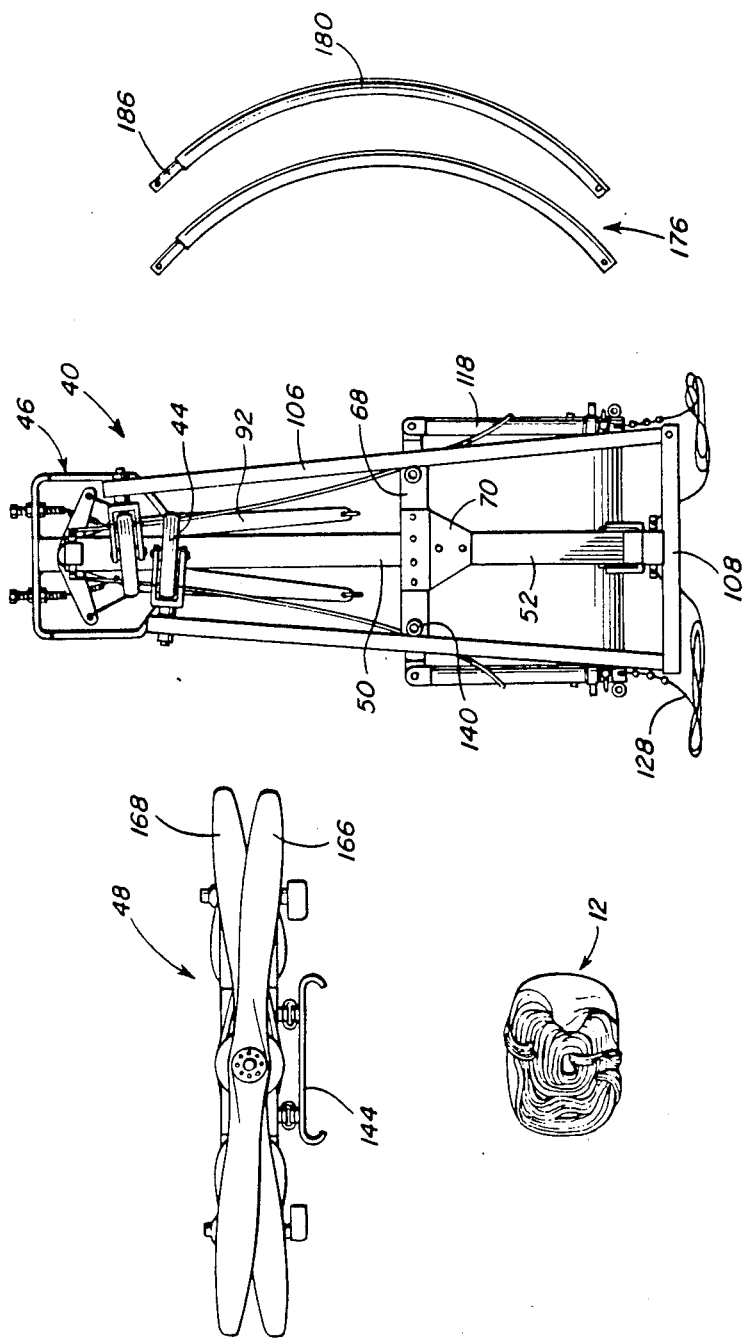
FIG. 22 is an elevation view of the disassembled and folded or collapsed portions of the aircraft.
Figure 23:
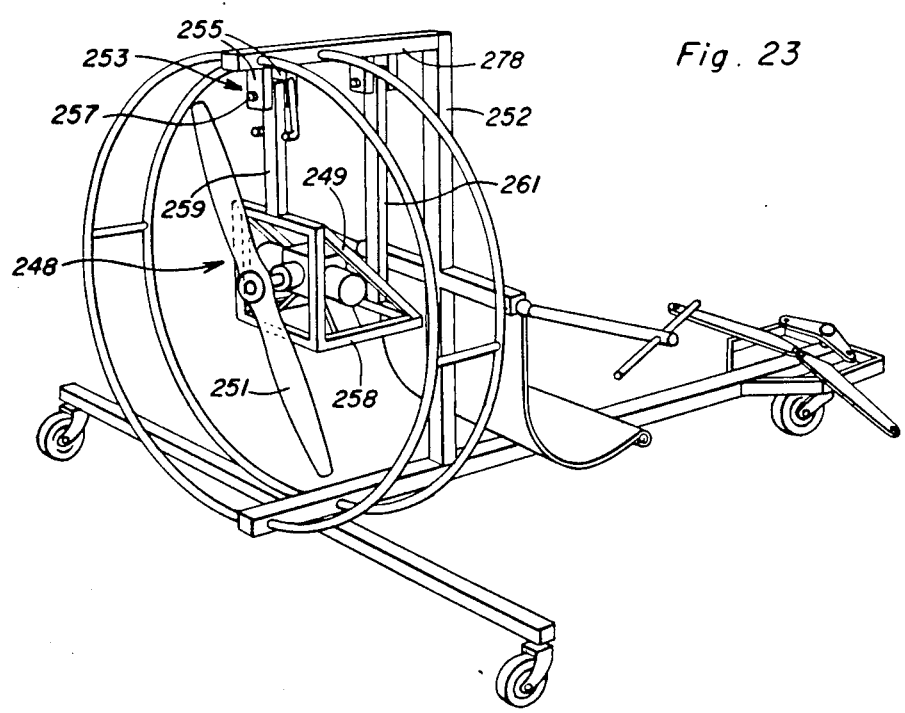
Figure 24:
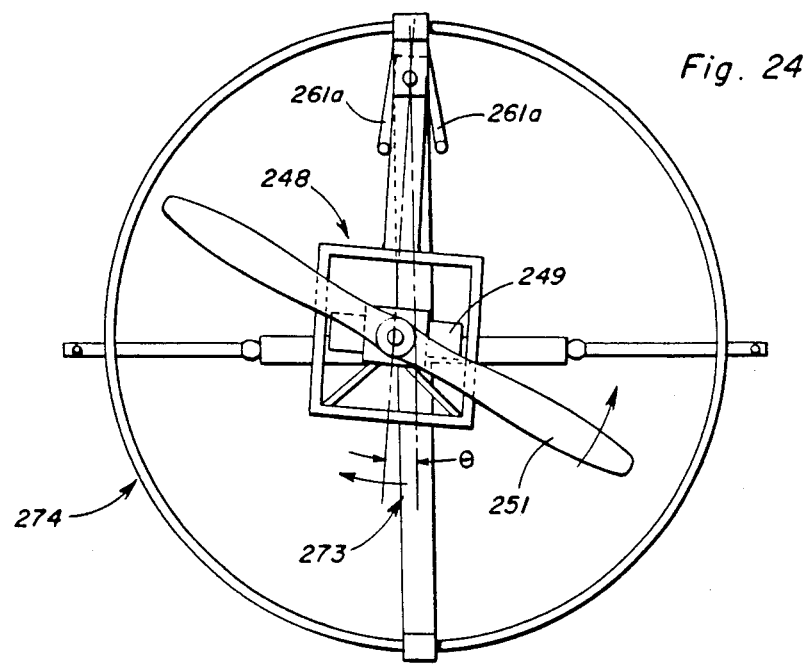
Figure 25:
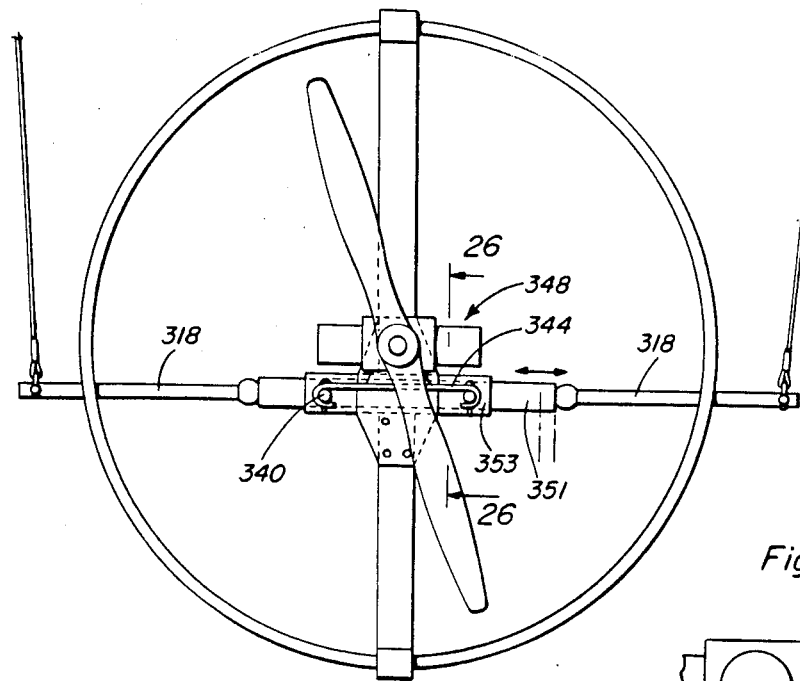
Figure 26:
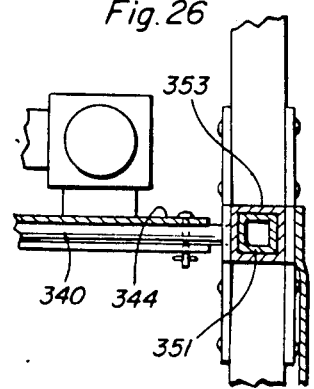
Figure 28:
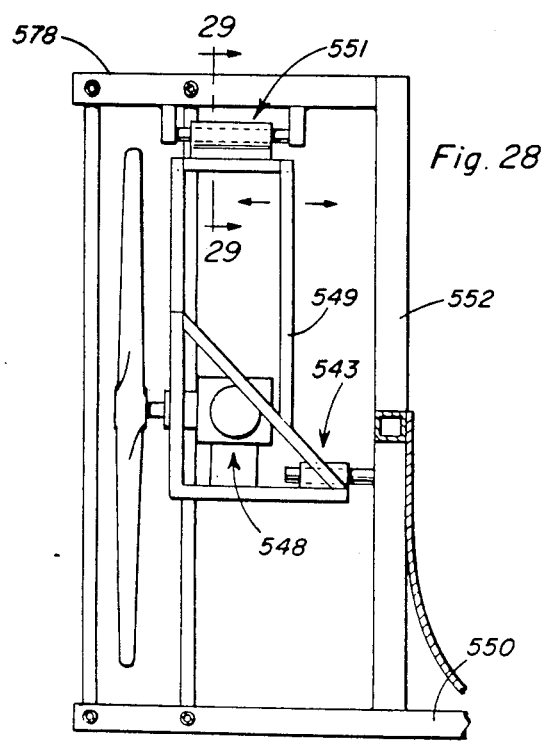
Figure 29:
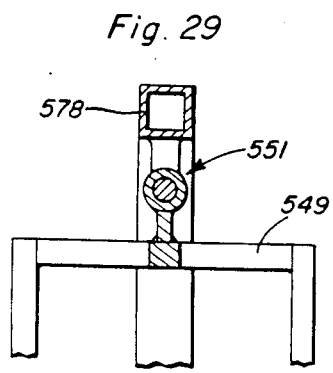
Figure 27:
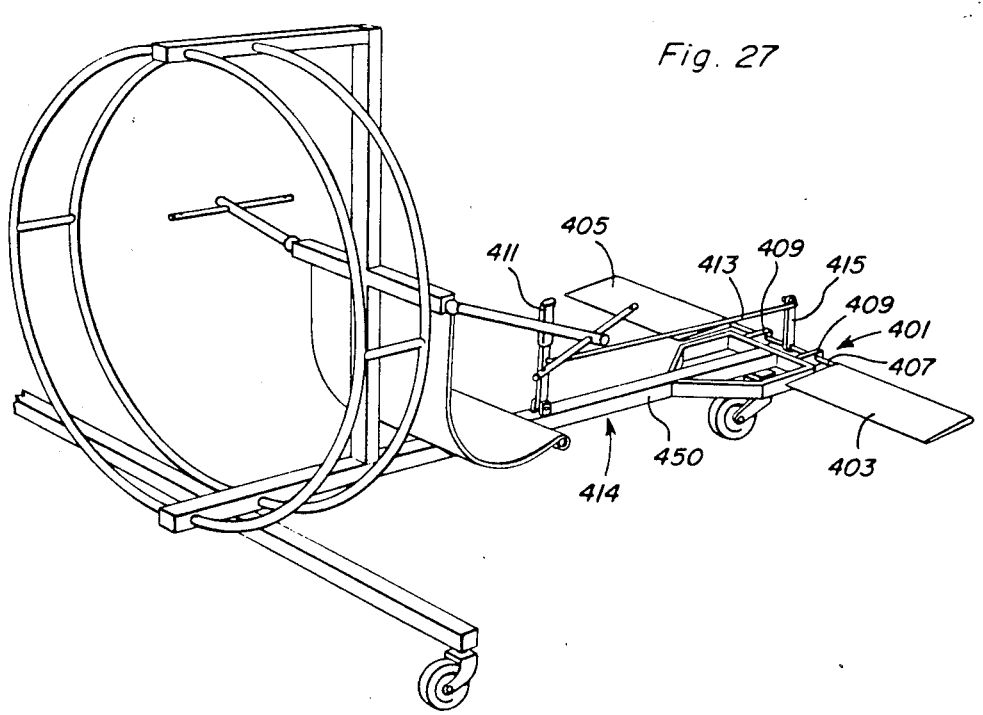
Figure 30:
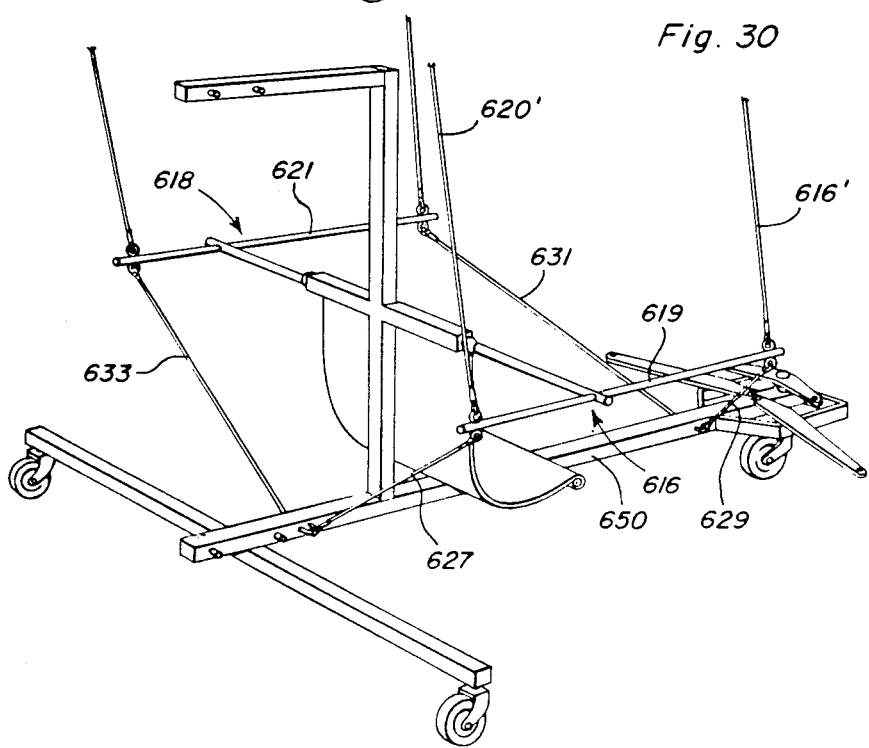

It will be apparent that the type of aircraft hereinbefore described is more readily reduced in overall size for storage purposes because of the collapsible nature of the flexible airfoil wing or canopy 12. Further, the vehicle frame assembly is by virtue of the described construction foldable and collapsible to yet a further reduced storage size. FIG. 22 illustrates various portions of the aircraft disassembled from each other. The canopy 12 is shown collapsed and folded up as in the case of the usual parachute canopy while the forward thrust producing unit 48 is shown disassembled from the vehicle frame assembly. Also, the two sections 176 of the propeller guard are shown disassembled from the vehicle frame assembly. The vehicle frame assembly 40 itself is collapsed to a compact form by folding of the frame member 50 into close parallel spaced relationship to the rear frame section 52 with the retracted anchor positioning elements 118 pivotally suspended from the cross bar 68. Also folded by more than 180 from the extended positions, are the leg elements 106 on which the rear wheel assemblies 44 are carried. In such folded positions, the leg elements 106 abut the support bars 140 projecting from the cross bar 68 so as to position the rear caster wheel assemblies 44 in close spaced relationship to each other. One of the leg elements 106 will therefore be shorter than the other. It will be apparent that with such portions of the aircraft disassembled, collapsed or folded, the aircraft may be stored in a very compact form for transport to any launching site. At the launching site, the vehicle frame assembly 40 is erected as hereinbefore described, the forward thrust producing unit 48 assembled onto the erected frame assembly and the propeller guard extended and mounted. The canopy 12 may then be unfolded, placed on the ground in trailing relationship to the erected vehicle frame assembly, the load lines attached to the anchor points 112 and 114 and the directional control lines 26 attached to the steering control levers 92 for aircraft launching and take-off.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a ram air inflated flexible airfoil canopy having a leading edge portion extending spanwise transverse to a forward direction of travel, a trailing edge portion and a bottom portion extending chordwise between the leading and trailing edge portions, a pilot supporting vehicle having a longitudinal axis, a plurality of flexible load lines connecting the canopy to the vehicle, and powered means mounted on the vehicle for imparting forward thrust thereto in said forward direction of travel, the improvement residing in means connecting the load lines to the vehicle for suspension thereof from the canopy varying between level flight and take-off attitudes in response to changes in said forward thrust, including at least two pivotal load line anchors from which the load lines respectively extend to the leading edge portion of the canopy and to the bottom portion intermediate the leading and trailing edge portions, and means mounting said two anchors on the vehicle spaced from each other along said longitudinal axis, said anchor mounting means including an arm on which the two anchors are located, and means connected to the vehicle for operatively positioning the arm in laterally spaced relation to the longitudinal axis in response to tensioning of the load lines, and means for locking the arm at an adjusted location along the longitudinal axis in response to said operative positioning thereof by the positioning means, the positioning means including a cross bar rigidly connected to the vehicle, a lever element having opposite ends, the arm being rigidly connected to the lever element at one of said ends thereof, and hinge means connecting the lever element at the other end thereof to the cross bar for displacement about perpendicular axes between retracted and extended positions, one of the axes being a vertical adjustment axis about which the arm is located and locked by the locking means when operatively positioned in response to said tensioning of the load lines.

2. The improvement as defined in claim 1 wherein said vehicle includes an elongated frame having opposite end portions and extending generally parallel to said longitudinal axis, a mast rigidly connected to the frame intermediate said end portions to which the anchor mounting means is connected, a dirigible wheel assembly mounted by the frame at one of said end portions forwardly of the mast, foldable leg means pivotally connected to the frame rearwardly of the mast for displacement by more than 180° between folded positions and laterally extended positions, and a pair of caster wheel assemblies mounted on the leg means in laterally spaced relation to the longitudinal axis in the extended positions of the leg means and in spaced adjacency to each other in the folded positions of the leg means.

3. The improvement as defined in claim 2 wherein the powered means includes a fuel operated engine assembly mounted on the vehicle, propeller means drivingly connected to the engine assembly for rotation about a propeller axis substantially parallel to said longitudinal axis of the vehicle, and torque compensating means for balancing thrust components applied to the vehicle in response to rotation of the propeller means.

4. The improvement as defined in claim 3 wherein the torque compensating means includes transmission means drivingly connected between the engine assembly and the propeller means for transmitting torque in opposite directions, said propeller means comprising a pair of counter-rotating pusher propellers.

5. The improvement as defined in claim 4 including propeller guard means mounted on the vehicle in protective relation to the propeller means at the other of the end portions of the frame.

6. The improvement as defined in claim 5 including ground steering means connected to the dirigible wheel assembly, steering control means connected to the canopy for directionally controlling airborne travel, and pilot operated means movably mounted on the vehicle for actuating the ground steering means and the steering control means to exercise similar directional control on the ground during said take-off and in flight by common steering control movements.

7. In combination with a ram air inflated flexible airfoil canopy having a leading edge portion extending spanwise transverse to a forward direction of travel, a trailing edge portion and a bottom portion extending chordwise between the leading and trailing edge portions, a pilot supporting vehicle having a longitudinal axis, a plurality of flexible load lines connecting the canopy to the vehicle, and powered means mounted on the vehicle for imparting forward thrust thereto in said forward direction of travel, the improvement residing in means connecting the load lines to the vehicle for suspension thereof from the canopy varying between level flight and take-off attitudes in response to change in said forward thrust, including at least two pivotal load line anchors from which the load lines respectively extend to the leading edge portion of the canopy and to the bottom portion intermediate the leading and trailing edge portions, and means mounting said two anchors on the vehicle spaced from each other along said longitudinal axis, said vehicle including an elongated frame having opposite end portions and extending generally parallel to said longitudinal axis, a mast rigidly connected to the frame intermediate said end portions to which the anchor mounting means is connected, a dirigible wheel assembly mounted by the frame at one of said end portions forwardly of the mast, foldable leg means pivotally connected to the frame rearwardly of the mast for displacement by more than 180° between folded positions and laterally extended positions, and a pair of caster wheel assemblies mounted on the leg means in laterally spaced relation to the longitudinal axis in the extended positions of the leg means and in spaced adjacency to each other in the folded positions of the leg means.

8. The improvement as defined in claim 7 wherein the frame includes a foldable rear end section on which the leg means is mounted.

9. The improvement as defined in claim 8 wherein the powered means includes a fuel operated engine assembly mounted on the vehicle, propeller means mounted on the vehicle rearwardly of the mast above the frame, a fuel tank mounted on the frame below the engine assembly, propeller means drivingly connected to the engine assembly for rotation about a propeller axis substantially parallel to said longitudinal axis of the vehicle, and guard means mounted on the frame in protective relation to the propeller means at the other of the end portions of the frame.

10. In combination with an airborne vehicle including an elongated frame member, a rear end frame section pivotally connected to the frame member and foldable leg means operatively connected to the rear end frame section for alternate disposition in storage and laterally extended positions, including a pair of channel members fixedly secured to the rear end frame section, and a pair of leg bars pivotally connected to the channel members and displaceable relative thereto by more than 180° between the extended and storage positions of the leg means when the rear end frame section is folded into generally parallel relation to the frame member.

11. In combination with a flexible airfoil canopy, a vehicle having a longitudinal axis, and a plurality of load lines connecting the canopy to the vehicle, the improvement residing in said vehicle including an elongated frame member extending generally parallel to said longitudinal axis, a mast pivotally connected to the frame member, a dirigible wheel assembly mounted by the frame member forwardly of the mast, a rear end frame section rigidly connected to the mast extending rearwardly therefrom, leg means operatively connected to the rear end frame section for alternate disposition in storage and laterally extended positions, and a pair of caster wheel assemblies mounted on the leg means in laterally spaced relation to the longitudinal axis of the vehicle in the extended positions of the leg means, an anchor arm having spaced portions at which the load lines connect the canopy to the vehicle, a cross bar rigidly connected to the mast, and means mounted on the cross bar for locking the anchor arm in fixed laterally spaced relation to the longitudinal axis in response to tensioning of the load lines by lift exerted on the canopy.

12. The improvement as defined in claim 11 including a forward thrust producing unit, and support means rearwardly projecting from the cross bar for removable mounting of the unit on the vehicle above the rear end frame section.

13. In combination with a flexible airfoil canopy, a vehicle having a longitudinal axis, and a plurality of load lines connecting the canopy to the vehicle, the improvement residing in said vehicle including an elongated frame member extending generally parallel to said longitudinal axis, a mast pivotally connected to the frame member, a dirigible wheel assembly mounted by the frame member forwardly of the mast, a rear end frame section rigidly connected to the mast extending rearwardly therefrom, leg means operatively connected to the rear end frame section for alternate disposition in storage and laterally extended positions, and a pair of caster wheel assemblies mounted on the leg means in laterally spaced relation to the longitudinal axis of the vehicle in the extended positions of the leg means, an anchor arm having spaced portions at which the load lines connect the canopy to the vehicle, a cross bar rigidly connected to the mast, and means mounted on the cross bar for operatively positioning the anchor arm in laterally spaced relation to the longitudinal axis in response to tensioning of the load lines by lift exerted on the canopy, said foldable leg means including a pair of channel members fixedly secured to the rear end frame section, and a pair of leg bars pivotally connected to the channel members and displaceable relative thereto by more than 180° between the extended positions of the leg means and the storage positions when the rear end frame section is folded into generally parallel relation to the frame member.

* * * * *